(12) United States Patent
Wortham

(10) Patent No.: US 6,308,060 B2
(45) Date of Patent: *Oct. 23, 2001

(54) METHOD AND APPARATUS FOR PROVIDING A COMMUNICATION PATH USING A PAGING NETWORK

(75) Inventor: Larry C. Wortham, Garland, TX (US)

(73) Assignee: @Track Communications, Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,000

(22) Filed: Jun. 15, 1998

(51) Int. Cl.[7] .................................................. H04M 3/42
(52) U.S. Cl. ........................... 455/414; 455/426; 455/551
(58) Field of Search ................................... 455/552, 551, 455/426, 553, 38.1, 31.2, 31.3, 405, 406, 407, 38.2, 414, 461, 233.1; 340/825.44

(56) References Cited

U.S. PATENT DOCUMENTS

| | | | |
|---|---|---|---|
| 4,987,317 | 1/1991 | Pournain et al. | 307/40 |
| 5,054,052 | 10/1991 | Nonami | 379/57 |
| 5,090,051 * | 2/1992 | Muppidi et al. | 455/410 |
| 5,148,473 | 9/1992 | Freeland et al. | 379/59 |
| 5,151,929 | 9/1992 | Wolf | 379/57 |
| 5,153,903 | 10/1992 | Eastmond et al. | 379/57 |
| 5,175,758 | 12/1992 | Levanto et al. | 379/57 |
| 5,307,399 | 4/1994 | Dai et al. | 379/57 |
| 5,392,452 | 2/1995 | Davis | 455/38.1 |
| 5,428,666 * | 6/1995 | Fyfe et al. | 455/551 |
| 5,437,053 * | 7/1995 | Sawa et al. | 455/33.1 |
| 5,438,701 | 8/1995 | Yamada et al. | 455/89 |
| 5,491,739 | 2/1996 | Wadin et al. | 379/57 |
| 5,526,398 | 6/1996 | Okada et al. | 379/57 |
| 5,541,976 | 7/1996 | Ghisler | 379/57 |
| 5,544,225 * | 8/1996 | Kennedy, III et al. | 455/412 |
| 5,563,931 * | 10/1996 | Bishop et al. | 455/404 |
| 5,590,396 | 12/1996 | Henry | 455/33.1 |
| 5,625,884 | 4/1997 | Gitlin et al. | 455/54.1 |
| 5,701,337 | 12/1997 | Silver et al. | 379/57 |
| 5,722,084 * | 2/1998 | Chakrin et al. | 455/551 |
| 5,737,707 * | 4/1998 | Gaulke et al. | 455/556 |
| 5,802,470 * | 9/1998 | Gaulke et al. | 455/426 |
| 5,918,172 * | 6/1999 | Saunders et al. | 455/404 |
| 5,974,331 * | 10/1999 | Cook et al. | 455/461 |
| 6,016,427 * | 1/2000 | Barber et al. | 455/434 |
| 6,075,988 * | 6/2000 | Anderson et al. | 455/434 |
| 6,178,335 * | 1/2001 | Vu | 455/558 |

* cited by examiner

Primary Examiner—Dwayne Bost
Assistant Examiner—Joy K. Contee
(74) Attorney, Agent, or Firm—Locke Liddell & Sapp LLP

(57) ABSTRACT

A system for providing a communication path includes a platform, a paging network, a mobile unit, and a mobile voice communications network. The platform delivers a paging signal comprising call setup information to a page receiver of the mobile unit using the paging network. A transceiver of the mobile unit selects a particular NAM in response to the call setup information and registers with the network using the selected NAM to enable the establishment of a communication path between the platform and the mobile unit.

34 Claims, 3 Drawing Sheets

FIG. 2A

| PIN | MIN | PASSWORD | HOSTS (ENHANCED SERVICES MODULES) |
|---|---|---|---|
| 1242 | 099-881-1234 | **** | MONITOR EMERGENCY BROKER |
| 1816 1817 | 214-555-1234 | **** | LOCATE EMERGENCY DISPATCH |
| ⋮ | ⋮ | **** | ⋮ |
| 1998 | 099-881-4328 099-881-1957 | **** | MONITOR EMERGENCY BROKER |

| ENHANCED SERVICES | PAGING CODE |
|---|---|
| MONITOR | 1** |
| GATHER ENGINE PERFORMANCE | 101 |
| GATHER TRAILER TEMPERATURE | 102 |
| GATHER VEHICLE SPEED | 103 |
| ⋮ | ⋮ |
| LOCATE | 2** |
| PROVIDE DIRECTIONS | 201 |
| LOG TRAVEL POINTS | 202 |
| GATHER VEHICLE LOCATION FIX | 203 |
| ⋮ | ⋮ |
| EMERGENCY | 3** |
| UNLOCK DOORS | 301 |
| IMMOBILIZE VEHICLE | 302 |
| SOUND ALARM | 303 |
| ⋮ | ⋮ |
| BROKER | 4** |
| PROVIDE LOAD INFORMATION | 401 |
| REQUEST LOAD INFORMATION | 402 |
| MONITOR LOAD DELIVERY | 403 |
| ⋮ | ⋮ |
| ⋮ | ⋮ |
| DISPATCH | 5** |
| ⋮ | ⋮ |
| OTHER | *** |

FIG. 2B

METHOD AND APPARATUS FOR PROVIDING A COMMUNICATION PATH USING A PAGING NETWORK

TECHNICAL FIELD OF THE INVENTION

This invention relates generally to the field of telecommunications, and more particularly to a method and apparatus for providing a communication path using a paging network.

BACKGROUND OF THE INVENTION

Mobile voice communications technology has enjoyed substantial growth over the past decade. Many cars, trucks, airplanes, boats, and other vehicles are equipped with devices that allow convenient and reliable mobile voice communications using a network of satellite-based or land-based transceivers. Advances in this technology have led to widespread use of portable mobile units, such as hand-held or vehicle-mounted cellular telephones, for voice communications. Demands for further advances include mobile voice communications technology capable of supporting personal and enhanced services, such as emergency assistance and vehicle monitoring, locating, and tracking.

SUMMARY OF THE INVENTION

In accordance with the present invention, the disadvantages and problems associated with previous techniques used to provide communication paths have been substantially reduced or eliminated.

According to one embodiment of the present invention, a system for providing a communication path between a platform and a mobile unit includes a paging network and a mobile voice communications network. A platform coupled to the paging network and the mobile voice communications network communicates a paging signal having call setup information using the paging network. The mobile unit includes a paging device and a transceiver. The paging device receives the paging signal. The transceiver selects a particular number assignment module in response to the call setup information and initiates registration with the mobile voice communications network using the selected number assignment module to enable the establishment of a communication path between the platform and the mobile unit.

According to another embodiment of the present invention, a method for providing a communication path between a platform and a mobile unit includes communicating a paging signal having call setup information to a mobile unit using a paging network. The method continues by selecting at the mobile unit a particular number assignment module in response to the call setup information. The method concludes by registering a transceiver of the mobile unit with a mobile voice communications network coupled to the platform using the selected number assignment module to enable the establishment of a communication path between the platform and the mobile unit.

Technical advantages of the present invention include a communication system that provides a communication path between a platform and a mobile unit by forwarding call setup information to a transceiver of a mobile unit in a paging signal using a paging network to cause registration of the transceiver with a mobile voice communications network using a specified number assignment module (NAM) prior to attempting a call to the transceiver. In a particular embodiment, the NAM is associated with the call setup information and is designated for use with the communication system.

Registering the transceiver with the mobile voice communications network using the designated NAM in response to the call setup information delivered by the paging network allows the transceiver to receive calls using multiple NAMs without requiring the transceiver to register each NAM with the network simultaneously. As a result, the transceiver may remain unregistered or may maintain registration with a network using a single NAM while preserving multiple NAM capabilities. For example, the transceiver may remain registered with the network using only a personal NAM and remain capable of simultaneously receiving enhanced services using a NAM specified in a paging signal. This allows the transceiver to conserve power and the platform to determine remotely the specific NAM to be used for a particular communication path.

Further technical advantages include providing sensors and actuators at the mobile unit to facilitate the provisioning of enhanced services using the communication path. For example, the sensors may generate information on the status or condition of the mobile unit or its operator and, in response, initiate a request for enhanced services. In another example, actuator data generated by enhanced services hosts and communicated to the mobile unit may be used to unlock the doors, immobilize the vehicle, sound an alarm, or perform any function remotely using an appropriate actuator coupled to the mobile unit.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIGS. 2a–2b illustrate exemplary tables used by the system; and

DETAILED DESCRIPTION OF THE INVENTION

Figure 1:
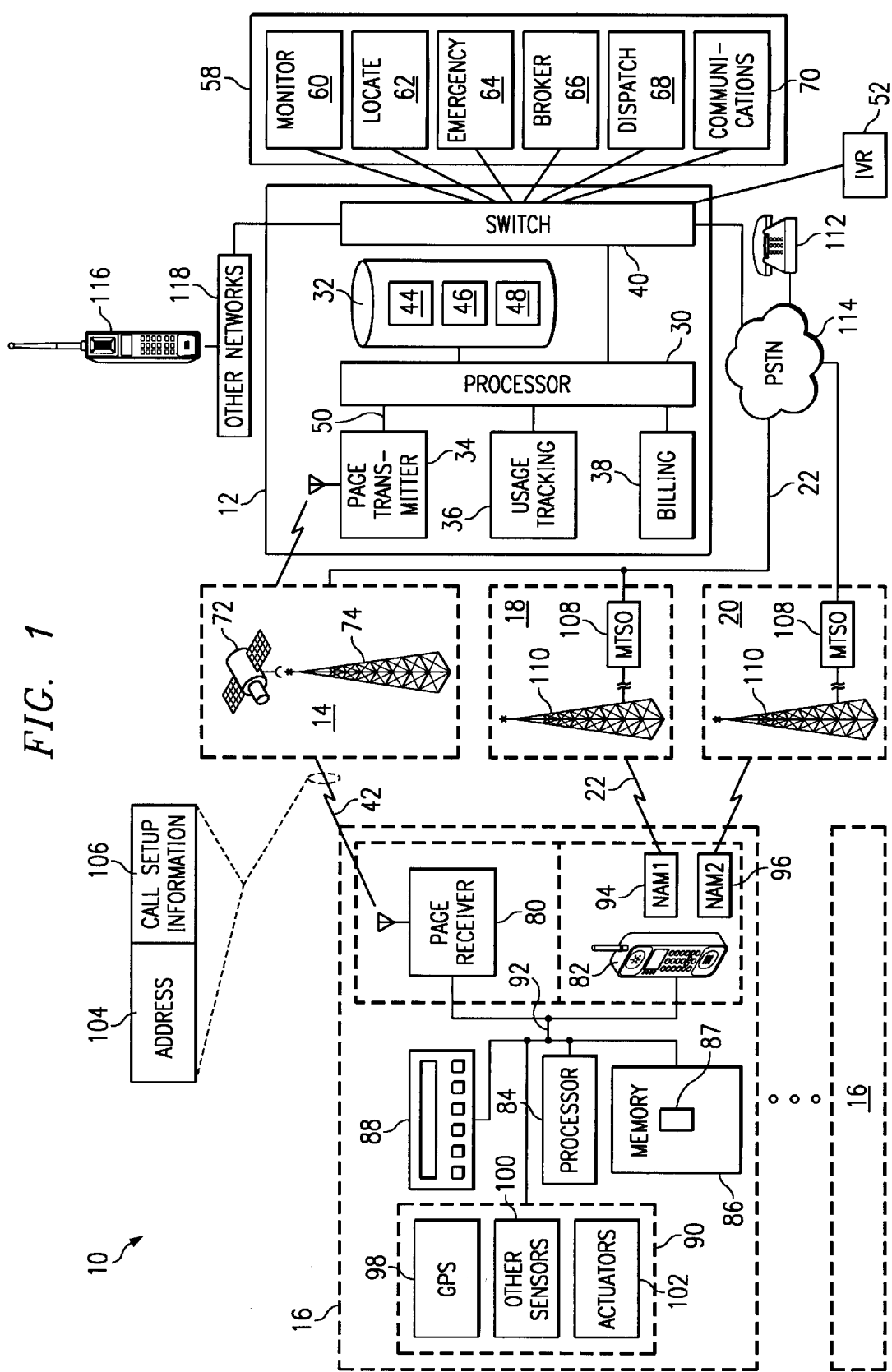
FIG. 1 illustrates a system for providing a communication path between a platform and a mobile unit using a paging network.

FIG. 1 illustrates a communication system 10 that includes a platform 12, a paging network 14, a mobile unit 16, and mobile voice communications networks 18 and 20. In general, platform 12 delivers a paging signal that includes call setup information to a page receiver at mobile unit 16 via paging network 14. In response, a transceiver of mobile unit 16 selects a particular number assignment module (NAM) associated with the call setup information and registers with network 18 using the selected NAM. System 10 then establishes a communication path between platform 12 and mobile unit 16 over network 18 using the selected NAM.

Platform 12 may comprise a processor 30 coupled to a memory 32, a page transmitter 34, a usage tracking system 36, a billing system 38, and a switching device 40. Platform 12 may also include any combination of other processing, communication, and storage devices suitable to receive a call for mobile unit 16 and issue an appropriate paging signal 42 to mobile unit 16 using paging network 14. Paging signal 42 prompts mobile unit 16 to register with network 18 using NAM 94 so that system 10 may establish a communication path 22 between platform 12 and mobile unit 16. Platform 12 provides vehicle locating, call delivery, data messaging, billing, usage tracking, and a variety of other enhanced services to mobile unit 16, as described in detail below. Platform 12 can also implement other more advanced telecommunications features, such as those offered by a central office (CO) or mobile telecommunications switching office (MTSO) of a public switch telephone network (PSTN).

Processor 30 comprises a central processing unit (CPU) or any other computing device that manages the communicating and processing features of platform 12. For example, processor 30 processes incoming calls, initiates calls, determines a set of enhanced services subscribed to by the caller or mobile unit 16, and generates a paging signal 42 for delivery to mobile unit 16.

Memory 32 comprises a file, a stack, or any other suitable organization of volatile or non-volatile memory that stores a customer profile table 44, a format table 46, and a communication table 48. Customer profile table 44 includes customer personal identification numbers (PINs), a list of enhanced service modules subscribed to by the customer, and the mobile identification number (MIN) of any associated mobile units 16. Format table 46 includes enhanced services and corresponding paging codes that allow processor 30 to generate paging signal 42. Communication table 48 includes a list of MSCIDs, SIDs, SWIDs, NPAs, RAPs, and other communications service provider identifiers, correlated with geographical service area, to determine the proper access number and calling procedure to establish communication path 22 with mobile unit 16.

Page transmitter 34 is coupled to processor 30 via link 50. Page transmitter 34 comprises a traditional paging device that provides data transmission and reception capabilities over paging network 14. In one embodiment, page transmitter 34 is disposed at a central messaging center of paging network 14 which is remotely located from platform 16. Link 50 can be any appropriate dedicated or switched link that supports communication of data between platform 12 and page transmitter 34.

Processor 30 records call information, such as the number and length of calls to each mobile unit 16, in usage tracking system 36. Billing system 38 uses the information stored in usage tracking system 36 to generate bills detailing the use of platform 12. If several mobile units 16 are associated with a particular company or organization, such as a fleet of trucks, billing system 38 generates a consolidated bill for all calls to and from mobile units 16 installed in the fleet of trucks.

Switching device 40 comprises a private branch exchange (PBX), an automatic call distributor (ACD), or any other suitable telephone switching facility. Switching device 40 directs incoming calls to various hosts 58 that provide enhanced services to mobile unit 16, and directs outgoing calls from platform 12 or hosts 58 to mobile unit 16. In one embodiment, switching device 40 is coupled to interactive voice response (IVR) module 52 that provides menu options to a caller, and receives commands from the caller, regarding enhanced services provided by hosts 58. Hosts 58 may include a number of enhanced service modules 60–70, including a monitor module 60, a locate module 62, an emergency module 64, a broker module 66, a dispatch module 68, and a communications module 70. Although FIG. 1 illustrates six enhanced service modules, it should be understood that platform 12 may support additional enhanced service modules capable of providing a wide variety of enhanced services to mobile unit 16. In addition, different companies may operate enhanced service modules 60–70 to provide these enhanced services.

Enhanced service modules 60–70 provide the flexibility and modularity to deliver enhanced services through platform 12 and networks 14 and 18 at a reduced cost and complexity by using a NAM 94 designated for use with communication system 10. Although the following description is detailed with reference to a single NAM 94 designated for hosts 58, it should be understood that several NAMs may be designated for hosts 58, including one NAM for each enhanced service module 60–70. Furthermore, the present invention contemplates a centralized or distributed architecture for the components and functionality of platform 12 and hosts 58.

An engine or trailer manufacturer operates monitor module 60 that provides engine and trailer performance monitoring of mobile unit 16. For example, monitor module 60 may initiate the establishment of communication path 22 to download engine performance information from a vehicle associated with mobile unit 16 and to provide information or commands to control certain aspects of the engine operation. Using a vehicle's onboard computer and communication path 22, monitor module 60 can respond to vehicle information and generate messages, including audible messages or warnings, alerting the driver or dealer of a potential problem.

Locate module 62 maintains a variety of maps, directions, and other geographical information to track, locate, provide directions to, or otherwise provide geographical services to mobile unit 16. In one embodiment, locate module 62 initiates the establishment of communication path 22 to download to mobile unit 16 maps, directions, updates to previous directions, return directions to an origination point, or any other piece of geographical information or service. For example, locate module 62 may use communication path 22 to establish voice communications that provide audible directions to an operator of mobile unit 16. Locate module 62 can simultaneously maintain a database or log of the most frequently traveled destinations by mobile unit 16. In another embodiment, locate module 62 downloads a location fix of mobile unit 16 in response to a user request.

Emergency module 64, coupled to police, fire, security, or other organizations or personnel, provides emergency and security services to persons or vehicles associated with mobile unit 16. For example, module 64 may automatically alert the authorities in the event of a vehicle theft, and provide a location update and tracking information to aid in vehicle recovery. Emergency module 64 may also summon medical personnel in the event of a medical emergency, and may maintain a database of relevant medical information on the user of mobile unit 16. In this regard, emergency module 64 may initiate the establishment of communication path 22 to download from mobile unit 16 information such as location information, engine information, personal medical information, or any other information on the status or condition of mobile unit 16, or its operator. In one embodiment, emergency module 64 may deliver audible messages or perform other voice communications using communication path 22 to provide emergency and security services to persons or vehicles associated with mobile unit 16.

For roadside assistance, emergency module 64 can use communication path 22 to download from mobile unit 16 a precise vehicle location and previous travel direction, as well as the color, make, model, and license number of the vehicle, to more effectively dispatch personnel for assistance. In dispatching a variety of services, emergency module 64 may send a confirmation to mobile unit 16 and a time of arrival estimate.

Emergency module 64 provides other remote security features using actuators 102 coupled to mobile unit 16. For example, if a user locks the keys inside a vehicle equipped with mobile unit 16, the user can place a telephone call to emergency module 64 and enter a personal identification number (PIN), as described below. In response, platform 12 communicates paging signal 42 to mobile unit 16 that causes an actuator 102 in the vehicle to unlock the doors. In addition, platform 12 may communicate paging signal 42 to mobile unit 16 to cause it to select a particular NAM with which platform 12 establishes communication path 22. Platform 12 then uses communication path 22 to download commands or other information, such as, for example, commands to unlock the doors. Other actuator data generated by emergency module 64 and downloaded to mobile unit 16 using communication path 22 or paging signal 42 may be used to immobilize a vehicle, sound an alarm, or perform any function remotely using an appropriate actuator 102 coupled to mobile unit 16.

Broker module 66 and dispatch module 68 provide load brokering and dispatch services for trucks, taxis, barges, delivery trucks, or other vehicles associated with mobile unit 16. For example, broker module 66 initiates the establishment of communication path 22 to download load information to long-haul and less-than-local (LTL) fleets. Dispatch module 68 may be operated by a trucking service, taxi service, or other service that desires to manage, route, track, and provide enhanced services to a fleet of vehicles.

Platform 12 or any other communications service provider may operate communications module 70. Communications module 70 may initiate the establishment of communication path 22 to update or download software, system identification (SID) lists, NAMs, e-mail, or any other communications information or service to mobile unit 16. For example, communications module 70 maintains an e-mail mailbox for subscriber mobile units 16. Upon receiving an e-mail for a particular mobile unit 16, communications module 70 initiates the establishment of communication path 22 with mobile unit 16 to download the e-mail and any attached files.

Paging network 14 represents any type of pager messaging or data communications network, using land-based or spaced-based transceivers, repeaters, or transmitters, that support the communication of paging signals 42 between platform 12 and mobile unit 16. A spaced-based data messaging system uses one or more satellites 72 that receive communications from platform 12 and retransmit the communications to land-based transmitters 74 for broadcast to mobile unit 16. The satellites may be in geostationary orbit, low earth orbit (LEO), or any other configuration, and may utilize any suitable frequency band of communications, such as, for example frequency modulated (FM) signals. A land-based data communications network includes one or more land-based transmitters 74 that also communicate data using any suitable band of frequency. Paging network 14 represents one or a combination of the data messaging technologies discussed above that can provide regional or nationwide paging capabilities. Therefore, paging network 14 may transmit paging signal 42 without necessarily knowing the location of mobile unit 16.

Mobile unit 16 includes both a page receiver 80 for receiving incoming paging signal 42 from paging network 14 and a transceiver 82 for registering with mobile voice communications network 18. Page receiver 80 and transceiver 82 are coupled to a processor 84, a memory 86, an input/output device 88, and external devices 90 using a bus 92. Mobile unit 16 may be carried by all types of vehicles, including cars, trucks, airplanes, boats, barges, railcars, truck trailers, or with any other movable object benefitting from mobile communications services, including hand-held devices. Mobile unit 16 contemplates any arrangement, processing capability, memory allocation, or task assignment between page receiver 80, mobile voice communications transceiver 82, processor 84, memory 86, input/output device 88, and external devices 90.

Page receiver 80 provides data transmission and reception capabilities over paging network 14. Transceiver 82 provides mobile voice communications, but also includes multiple NAM registration control. In particular, transceiver 82 may register with either of NAMs 94 and 96 to support inbound and/or outbound communication. For example, NAM 94 may be designated for providing enhanced services, while NAM 96 provides traditional cellular services. Although the following description is detailed with reference to NAMs 94 and 96, it should be understood that transceiver 82 supports communication with any number of designated or traditional NAMs operating individually or simultaneously.

Processor 84 comprises a CPU or any other suitable computing device that manages the communicating, processing, locating, and reporting features of mobile unit 16. In one operation, processor 84 receives call setup information 106 contained in paging signal 42 from page receiver 80 and, in response, instructs transceiver 82 to register with network 18 using NAM 94 associated with call setup information 106. In another operation, processor 84 receives a "call-back" message from page receiver 80, and initiates a call using transceiver 82, network 18, and NAM 94. For example, processor 84 can gather various pieces of information from page receiver 80, transceiver 82, memory 86, input/output device 88, external devices 90, or other sources, and integrate this information into an information report for transmission over network 18 using NAM 94. The information report can be time-stamped using time generated by a clock associated with processor 84.

Memory 86 contains programs, maps, databases, and other information used by processor 84 to perform its functions. For example, memory 86 stores programs 87 used by processor 84 to implement the various enhanced services provided by platform 12 and to perform any commands associated with call setup information 106. In one embodiment, memory 86 stores NAMS, such as NAM 94, designated for providing enhanced services to mobile unit 16. Memory 86 can be random access memory (RAM), read-only memory (ROM), CD-ROM, removable memory devices, or any other device that allows storage or retrieval of data. Processor 84 and memory 86 may be separate or integral components of mobile unit 16.

Processor 84 is also coupled to input/output device 88. Device 88 is a keypad, touch screen, voice recognition software and related hardware, or other device that can accept information, such as digital data or audible commands and convey information associated with the operation of mobile unit 16, including digital data, visual information, or audio information. Device 88 includes fixed or removable storage media, such as magnetic computer disks, CD-ROM, or other suitable media to both receive output from and provide input to processor 84 or memory 86. For example, information correlating position of mobile unit 16 to identifiers of communications service providers is provided to input/output device 88 and stored in memory 86.

External devices 90 may include a global positioning system (GPS) device 98 that generates information on the geographic location of mobile unit 16. Other sensors 100 may include engine sensors, trailer sensors, personal medical sensors, airbag deployment sensors, accelerometers, security sensors, on-board positioning sensors, or other sensors that generate information on the status or condition of mobile unit 16, or its operator. Actuators 102 may include security alarm devices, door lock/unlock devices, engine cutoff devices, or any other actuators that can receive actuator commands associated with an enhanced service in system 10 and implement them on a vehicle associated with mobile unit 16.

Components of mobile unit 16 shown in FIG. 1 are packaged in one or more housings. Mobile unit 16 mounts to a vehicle, as described above, or can be packaged as a portable, hand-held device that provides personal timing, locating, communicating, and reporting functions. For example, police, firefighters, rescue teams, service and delivery personnel, individuals that may change forms of transportation, or other persons requiring portable communications can use a hand-held mobile unit 16.

Paging signal 42 may comprise address information 104 and call setup information 106. Address information 104 identifies one or more mobile units 16 to which call setup information 106 is directed. Call setup information 106 includes data to download to processor 84 or memory 86 over bus 92. For example, the data to be downloaded can be an instruction for transceiver 82 to register with network 18 using NAM 94. This information can be generated by a caller or platform 12 and can be transmitted as paging codes derived from format table 46. Enhanced services data and commands that require additional bandwidth for communication may be transmitted by platform 12 by using network 18 upon successfully establishing communication path 22 with mobile unit 16. For example, platform 12 may use communication path 22 to download updates to operational software of mobile unit 16, updates to SID lists, messages to the operator of mobile unit 16, commands to devices 90 (e.g., e-mail or otherwise), or other information for the operation of mobile unit 16 or an associated vehicle.

Mobile voice communications networks 18 and 20 represent a collection of one or more appropriate mobile communications networks, such as a cellular communication network, or any other satellite-based or land-based mobile voice communications network. For example, networks 18 and 20 may comprise a specialized mobile radio (SMR), an enhanced specialized mobile radio (ESMR), a personal communications service (PCS), a citizens band (CB), a dedicated radio system, such as those used by police and firefighters, or any other suitable mobile voice communications system. In the specific example of a cellular telephone network, networks 18 and 20 include a mobile telephone switching office (MTSO) 108 coupled to a cellular transmitter 110 servicing mobile unit 16. Networks 18 and 20 also include the network controllers, trunk lines, and other equipment that provide mobile communication to mobile unit 16.

In one embodiment, transceiver 82 of mobile unit 16 registers with network 20 using NAM 96, or any other personal NAM, to receive traditional voice services, such as, for example, sending and receiving voice calls. Transceiver 82 registers with network 18 using NAM 94, or any other NAM associated with enhanced service modules 60–70, to receive calls directed to mobile unit 16 by platform 12 or enhanced services provided by modules 60–70. Networks 18 and 20 are depicted as separate components in FIG. 1 for convenience and illustrative purposes only, but the present invention contemplates networks 18 and 20 as the same or different networks.

In operation, communication system 10 initiates the provisioning of communication path 22 between platform 12 and mobile unit 16 in response to inbound or outbound communications at platform 12 or mobile unit 16. For example, platform 12 initiates communication path 22 to request a report from mobile unit 16 or to provide enhanced services to mobile unit 16. Similarly, platform 12 may initiate communication path 22 to connect an incoming call from a caller 112. In another example, mobile unit 16 provides communication path 22 with platform 12 to conduct a voice call or a data call, such as a data call that downloads generated reports.

System 10 supports voice or data calls placed to mobile unit 16 from a variety of callers using a variety of communications technology. For example, caller 112 may initiate a call to mobile unit 16 by using the public switched telephone network (PSTN) 114. Using PSTN 114, caller 112 directs the call to platform 12 by inputting a traditional telephone number associated with platform 12 or mobile unit 16. In one embodiment, caller 112 inputs a 1+800 number to connect to platform 12. Although the following description is detailed with reference to caller 112, it should be understood that a caller 116 can initiate calls to mobile unit 16 using other communications networks 118, such as a specialized mobile radio (SMR), enhanced specialized mobile radio (ESMR), a personal communications service (PCS), a citizens band (CB), a dedicated radio system, such as those used by police and firefighters, or any other suitable communications link that allows caller 116 to direct a call to platform 12. Additionally, hosts 58 may initiate calls to mobile unit 16 using switch 40 and platform 12.

Upon establishing communications with platform 12, caller 112 enters a mobile unit identification number (MIN), a personal identification number (PIN), or other identification. Upon validating the MIN or PIN, processor 30 prompts caller 112 to select either a voice call or a data call, such as a data call that provides enhanced services to mobile unit 16. If caller 112 selects a voice call, then processor 30 formats address information 104 and call setup information 106 in paging signal 42 for transmission to mobile unit 16 via paging network 14.

If caller 112 selects a data call, then processor 30 accesses the appropriate profile of customer profile table 44 by using the PIN of caller 112 or the MIN of mobile unit 16, as entered by caller 112, to identify those hosts 58 to which caller 112 or mobile unit 16 subscribes. Caller 112 selects any of the subscribed hosts 58 and device 40 directs the incoming call to individual enhanced service modules 60–70 based upon the selections of caller 112. Alternatively, caller 112 may directly call any of individual enhanced service modules 60–70.

Each selected enhanced service module presents caller 112 with service options from which caller 112 may select one or more enhanced services. For example, platform 12 prompts caller 112 to select from all of the enhanced service modules 60–70 to which caller 112 subscribes according to customer profile table 44. If caller 112 selects emergency module 64, device 40 routes the call accordingly so that module 64 may present its offered services to caller 112. Platform 12 may use IVR module 52 to provide the service options to caller 112 and to receive the enhanced services selections from caller 112.

Upon receiving the service selections made by caller 112, processor 30 determines the paging codes that correspond with the selected enhanced services. In particular, processor 30 determines the appropriate paging code for each selected enhanced service and formats these paging codes and any other call setup information 106 in paging signal 42. Platform 12 issues paging signal 42 to mobile unit 16 via paging network 14. Specifically, page transmitter 34 receives paging signal 42 from processor 30 and communicates it to page receiver 80 over paging network 14. Alternatively, processor 30 communicates paging signals 42 to page receiver 80 over paging network 14 using PSTN 114.

Upon receiving paging signal 42, processor 84 of mobile unit 16 processes call setup information 106. For example, processor 84 may execute any commands included in call setup information 106. One such command may instruct transceiver 82 to register with network 18 using NAM 94 designated for use with enhanced service modules 60–70. For example, mobile unit 16 may receive traditional voice services from network 20 by using NAM 96 until platform 12 commands mobile unit 16 to register with network 18 using NAM 94. In one embodiment, call setup information 106 specifies NAM 94. In another embodiment, processor 84 determines NAM 94 by searching NAMs stored in memory 86 based upon call setup information 106.

Transceiver 82 then registers with network 18 coupled to platform 12 by using designated NAM 94. After a predetermined interval, or upon receipt of an acknowledgment from mobile unit 16 (e.g., two-way paging), platform 12 initiates the establishment of communication path 22 to mobile unit 16 using the newly selected and registered NAM. Upon providing communication path 22, platform 12 and mobile unit 16 may communicate a voice call, such as a voice call placed by caller 112, by the operator of mobile unit 16, or by hosts 58, a data call, such as a data call initiated by caller 112, hosts 58, or by the operator of mobile unit 16 providing enhanced services to mobile unit 16, downloading software to mobile unit 16, or downloading a report to platform 12, or any other inbound or outbound communication using communication path 22.

For example, caller 112 may conduct a voice call with the operator of mobile unit 12. In one embodiment, caller 112 or the operator of mobile unit 12 may directly place a call to each other. In another embodiment, platform 12 communicates paging signal 42, including a "call-back" message, to mobile unit 16 using paging network 14. The call-back message requests mobile unit 16 to call platform 12 or caller 112 without operator intervention. If mobile unit 16 calls platform 12, then the call from caller 112 and the call from mobile unit 16 are coupled to complete call delivery. In this case, platform 12 and mobile unit 16 can generate ring tones to simulate a direct call from caller 112 to mobile unit 16.

In another example, monitor module 60 may monitor the temperature of a trailer that carries cargo under refrigeration using sensors 100 and, in response, may initiate the establishment of communication path 22 to transmit the safe upper and lower temperature limits for the trailer to a processor 84 of an associated mobile unit 16. In yet another example, locate module 62 may initiate the establishment of communication path 22 to place a data call with mobile unit 16 prompting processor 84 to provide periodically a position fix using GPS 98. Mobile unit 16 may communicate this report without operator intervention using communication path 22.

Registering transceiver 82 with network 18 using NAM 94 in response to call setup information 106 delivered by paging network 14 provides several advantages. For example, transceiver 82 may receive calls using multiple NAMs, such as 94 and 96, without registering each NAM with networks 18 and 20 simultaneously. As a result, transceiver 82 may remain unregistered or may maintain registration with network 18 using a personal NAM 96 while remaining capable of simultaneously receiving enhanced services using NAM 94 specified by paging signal 42. This allows transceiver 82 to conserve power and platform 12 to determine remotely a particular NAM to be used for a particular communication path 22. It also allows platform 12 to initiate the establishment of communication path 22 with mobile unit 16 using the particular NAM.

FIG. 2a illustrates one embodiment of customer profile table 44 that includes PINs 120, MINs 122, passwords 124, and hosts 58. In general, table 44 associates PIN 120 of caller 112 or MIN 122 of mobile unit 16 to a password 124 and to those hosts 58 to which caller 112 or mobile unit 16 subscribes. For example, table 44 shows that caller 112 having PIN 120 of "1242" is subscribed to monitor module 60, emergency module 64, and broker module 66. It should be understood that information stored in PINs 120 and MINs 122 need not display a one-to-one correspondence. In particular, multiple PINs, such as "1816" and "1817", may be associated with a single MIN 122, such as "214-555-1234". Similarly, multiple MINs, such as "099-881-4328" and "099-881-1957", may be associated with a single PIN 120, such as "1998". Furthermore, although each host 58 is shown to have three enhanced service modules, this should not be construed to limit the teachings of the present invention to this or any particular number of enhanced service modules. Similarly, table 44 may associate each PIN 120 or MIN 122 with a particular type of enhanced service provided by multiple enhanced service modules. For example, a caller 112 or mobile unit 16 may subscribe to multiple emergency modules 64, each operated by a different company, to provide roadside assistance.

FIG. 2b illustrates one embodiment of format table 46 that includes enhanced services 130 and paging codes 132. Table 46 associates each enhanced service 130 provided by enhanced service modules 60–70 with a unique paging code 132 used to format paging signal 42. In particular, processor 30 of platform 12 references table 46 to determine the appropriate paging code 132 for each selected enhanced service 130. For example, paging code 132 for enhanced service 130 of "gather engine performance" is "101", while paging code 132 for enhanced service 130 of "gather vehicle location fix" is "203". It should be understood that paging codes 132 illustrated in table 46 may comprise a numeric format, an alpha-numeric format, or any other format suitable to provide a unique paging code 132 for each corresponding enhanced service 130.

Figure 3:
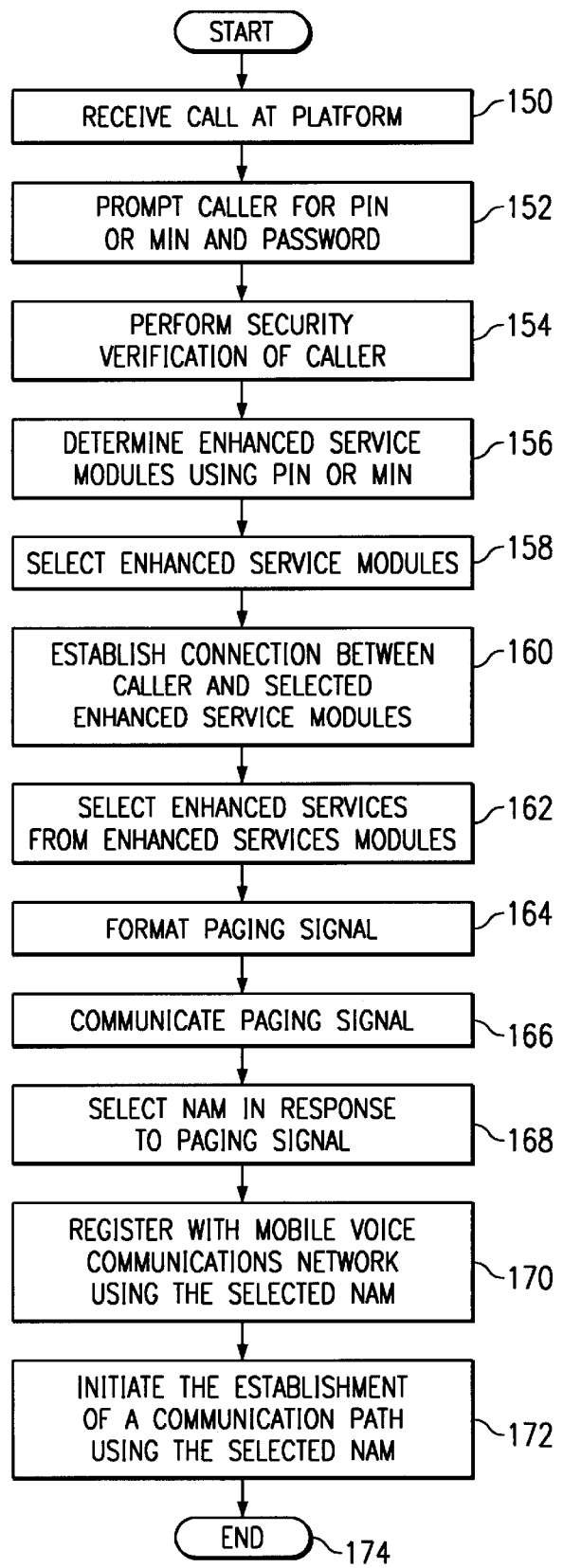
FIG. 3 illustrates one method for providing a communication path between a platform and a mobile unit using the paging network.

FIG. 3 is a flow chart of one method for providing communication path 22 between platform 12 and mobile unit 16. Although the flow chart illustrates providing communication path 22 in response to an incoming call at platform 12, it should be understood that system 10 provides communication path 22 in response to inbound or outbound communications at platform 12, mobile unit 16, or enhanced service modules 60–70. Platform 12 receives an incoming call from caller 112 using switch 40 at step 150. Processor 30 prompts caller 112 for an appropriate PIN 120 or MIN 122 and password 124 at step 152 using IVR module 52 (IVR). Based upon voice recognition, DTMF, or other input, platform 12 performs a security verification of caller 112 at step 154 and determines the enhanced service modules 60–70 to which caller 112 subscribes by referencing customer profile table 44 using the provided PIN 120 or MIN 122 and password 124 at step 156. It should be understood that although the description is detailed with reference to performing the security verification of caller 112 at platform 12, enhanced service modules 60–70 may perform a similar security verification if, for example, caller 112 calls a particular module 60–70 directly.

Caller 112 selects particular enhanced service modules 60–70 among those modules 60–70 to which caller 112 subscribes at step 158. Processor 30 establishes a connection between caller 112 and enhanced service modules 60–70 selected by caller 112 at step 160. Caller 112 selects particular enhanced services from selected enhanced service modules 60–70 at step 162. Processor 30 formats paging signal 42 at step 164. In particular, processor 30 references format table 46 to determine the appropriate paging code for each selected enhanced service 130 and formats paging signal 42 accordingly. Platform 12 communicates paging signal 42 to mobile unit 16 at step 166 by using paging network 14. Paging signal 42 includes address information 104 and call setup information 106. Transceiver 82 selects a particular NAM 94 associated with call setup information 106 and designated for use with system 10 at step 168. In one embodiment, processor 84 instructs transceiver 82 to select NAM 94. Transceiver 82 registers with network 18 using the selected NAM 94 at step 170. After a predetermined time interval, or upon receipt of an acknowledgment from mobile unit 16, platform 12 initiates the establishment of communication path 22 using the newly selected NAM 94 at step 172. The method concludes at step 174. Having established communication path 22, system 10 may deliver a voice or data call between platform 12 and mobile unit 16.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for providing a communication path between a platform and a mobile unit, comprising:
   a paging network;
   a mobile voice communications network;
   a platform coupled to the paging network and the mobile voice communications network, the platform comprising a first paging device operable to communicate a paging signal having call setup information using the paging network; and
   a mobile unit comprising a second paging device operable to receive the paging signal, the mobile unit further comprising a transceiver coupled to the second paging device and operable to select a particular number assignment module in response to the call setup information, the transceiver further operable to initiate registration with the mobile voice communications network using the selected number assignment module to enable the establishment of a communication path between the platform and the mobile unit.

2. The system of claim 1, wherein the mobile voice communications network is a cellular telephone network.

3. The system of claim 1, wherein the platform further comprises a plurality of enhanced service modules operable to provide enhanced services to the mobile unit using the communication path.

4. The system of claim 1, wherein the platform further comprises a switch operable to establish the communication path by directing a call from the platform to the mobile unit using the selected number assignment module.

5. The system of claim 1, wherein the platform further comprises:
   a memory that stores a customer profile table associating a customer with one or more selected enhanced service modules; and
   a processor coupled to the memory and operable to provide enhanced services to the mobile unit based upon the customer profile table.

6. The system of claim 1, wherein the platform further comprises:
   a memory that stores a format table associating enhanced services with paging codes; and
   a processor coupled to the memory and operable to generate the paging signal using the paging codes.

7. The system of claim 1, wherein the platform further comprises:
   a usage tracking system operable to store usage information associated with the use of the communication path; and
   a billing system operable to generate a bill using the usage information.

8. The system of claim 1, wherein the call setup information specifies the particular number assignment module.

9. The system of claim 1, wherein the mobile unit further comprises a processor coupled to the paging device, the processor operable to initiate a call to the platform in response to a call back message communicated in the paging signal.

10. The system of claim 1, wherein the transceiver includes a first number assignment module and a second number assignment module.

11. The system of claim 1, wherein the platform initiates the establishment of a communication path a predetermined amount of time after communicating the paging signal.

12. The system of claim 1, wherein the platform initiates the establishment of a communication path after receiving an acknowledgment from the mobile unit.

13. A method for providing a communication path between a platform and a mobile unit, comprising:
   communicating a paging signal having call setup information to a paging device of a mobile unit using a paging network;
   selecting at the mobile unit a particular number assignment module in response to the call setup information; and
   registering a transceiver of the mobile unit with a mobile voice communications network coupled to the platform using the selected number assignment module to enable the establishment of a communication path between the platform and the mobile unit.

14. The method of claim 13, further comprising:
   receiving an incoming call at the platform; and
   generating the paging signal using a paging device of the platform to deliver the incoming call to the mobile unit.

15. The method of claim 13, further comprising initiating the establishment of the communication path by directing a call from the platform to the mobile unit using the selected number assignment module.

16. The method of claim 13, further comprising:
   storing a format table associating enhanced services with paging codes; and
   generating the paging signal using the paging codes.

17. The method of claim 13, wherein the mobile voice communications network is a cellular telephone network.

18. The method of claim 13, wherein the platform further comprises a plurality of enhanced service modules operable to provide enhanced services to the mobile unit using the communication path.

19. The method of claim 13, wherein the platform further comprises:
   a memory that stores a customer profile table associating a customer with one or more selected enhanced service modules; and
   a processor coupled to the memory and operable to provide enhanced services to the mobile unit based upon the customer profile table.

20. The method of claim 13, wherein the call setup information specifies the particular number assignment module.

21. The method of claim 13, wherein the transceiver includes a first number assignment module and a second number assignment module.

22. The method of claim 13, further comprising initiating the establishment of the communication path a predetermined amount of time after communicating the paging signal.

23. The method of claim 13, further comprising initiating the establishment of the communication path after receiving an acknowledgement from the mobile unit.

24. A system for delivering a call to a mobile unit, comprising:
   a paging network;
   a mobile voice communications network;
   a platform coupled to the paging network and the mobile voice communications network, the platform comprising a first paging device operable to communicate a paging signal specifying a particular number assignment module to the mobile unit using the paging network and further operable to direct a call to the mobile unit using the mobile voice communications network; and
   the mobile unit comprising a second paging device operable to receive the paging signal, the mobile unit further comprising a transceiver coupled to the second paging device and operable to receive the call by registering with the mobile voice communications network using the specified number assignment module.

25. The system of claim 24, wherein the mobile voice communications network is a cellular telephone network.

26. The system of claim 24, wherein the platform directs the call to the mobile unit a predetermined amount of time after communicating the paging signal.

27. The system of claim 24, wherein the platform directs the call to the mobile unit after receiving an acknowledgment from the mobile unit.

28. The system of claim 24, wherein the platform further comprises a plurality of enhanced service modules operable to provide enhanced services to the mobile unit during the call.

29. The system of claim 24, wherein the platform further comprises:
   a memory that stores a customer profile table associating a customer with one or more selected enhanced service modules; and
   a processor coupled to the memory and operable to provide enhanced services to the mobile unit during the call based upon the customer profile table.

30. The system of claim 24, wherein the platform further comprises:
   a memory that stores a format table associating enhanced services with paging codes; and
   a processor coupled to the memory and operable to generate the paging signal using the paging codes.

31. The system of claim 24, wherein the transceiver includes a first number assignment module and a second number assignment module.

32. The system of claim 1, wherein the transceiver remains unregistered with the mobile voice communications network using the selected number assignment module prior to the receipt of the paging signal by the mobile unit.

33. The method of claim 13, wherein the transceiver remains unregistered with the mobile voice communications network using the selected number assignment module prior to the step of communicating the paging signal.

34. The system of claim 24, wherein the transceiver remains unregistered with the mobile voice communications network using the specified number assignment module prior to the receipt of the paging signal by the mobile unit.

* * * * *